United States Patent Office 3,408,830
Patented Nov. 5, 1968

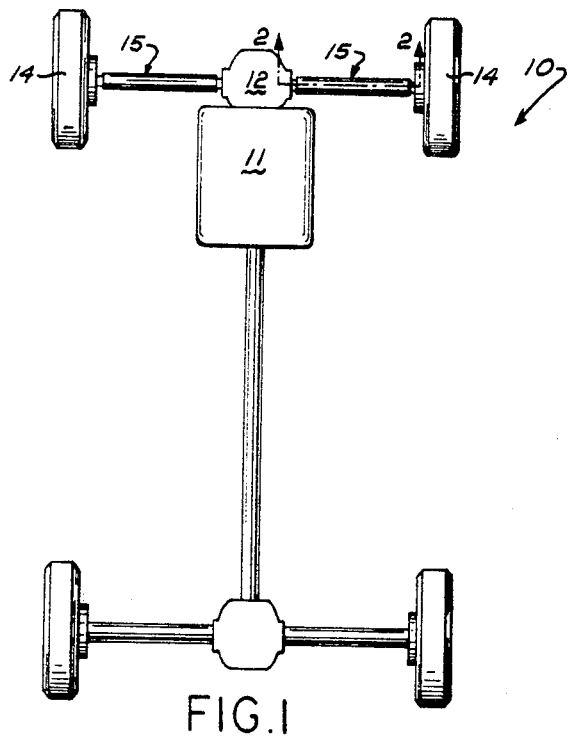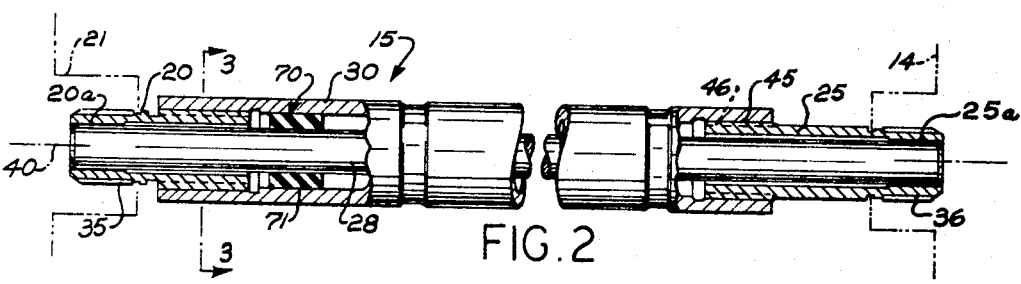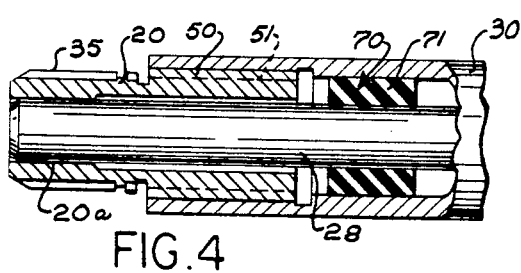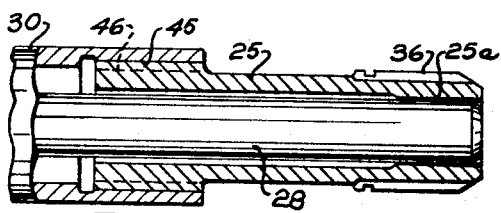

3,408,830
TORSION DRIVE ASSEMBLY
Alex Sutaruk, Hazel Park, Raymond L. Friedeman, Detroit, and Paul A. Lytikainen, Taylor, Mich., assignors to Eaton Yale & Towne Inc., Cleveland, Ohio, a corporation of Ohio
Filed Aug. 25, 1966, Ser. No. 575,495
3 Claims. (Cl. 64—27)

ABSTRACT OF THE DISCLOSURE

The present invention relates to a torsion drive assembly for use in transmitting torque from a drive element to a driven element, such as from an output element of a differential to a wheel of a motor vehicle. The present invention particularly relates to a two stage torsion drive assembly having a first torsion element for normally transmitting the torque and a second element which is automatically coupled to transmit the torque when the torsion element has been twisted a predetermined angular extent.

---

The principal object of the present invention is to provide a new and improved two stage torsion drive assembly for use in transmitting torque from a drive element to a driven element, such as from a drive or output element of a differential to a driving wheel of an automobile, and which is of a highly practical and economical construction, made up of a minimum number of parts, reliable in operation, and so constructed and arranged that it effectively cushions the impact and shock loads imparted thereto and dampens out noise due to the impact or shock loads imparted thereto.

A more specific object of the present invention is to provide a new and improved two stage torsion drive assembly in which the first and second torque transmitting elements are concentrically disposed and have a support means interposed therebetween to prevent contact between the concentric torque transmitting elements and fretting wear therebetween.

Yet another object of the present invention is to provide a new and improved two stage torsion drive assembly in which the first and second torque transmitting elements are drivingly connected with each other adjacent one end and carry portions at their other end which are interdigitated and are adapted to cooperably engage one another to effect a transmission of the torque through the second element when the first element has been twisted a predetermined angular extent, and in which a rubber grommet is preferably press fitted and interposed between the torque transmitting elements adjacent the coupling portions to support the elements in a radial spaced relation and prevent rattling and fretting wear between the torque transmitting elements and to aid in dampening out the noise due to impact loads being imparted to the drive assembly.

The present invention resides in certain novel constructions, combinations and arrangements of parts and further objects and advantages thereof will be apparent to those skilled in the art to which the invention relates from the following detailed description of the preferred embodiment thereof described with reference to the accompanying drawings, and wherein similar reference characters designate corresponding parts throughout the several views and in which:

FIG. 1 is a schematic view of a vehicle embodying the present invention;

FIG. 2 is an enlarged fragmentary sectional view with parts thereof shown in elevation of the preferred embodiment of the torsion assembly of the present invention and taken approximately along section line 2—2 of FIG. 1;

FIG. 3 is an enlarged sectional view taken approximately along section line 3—3 of FIG. 2;

FIG. 4 is an enlarged fragmentary sectional view of the left end portion of the torsion drive assembly shown in FIG. 2; and FIG. 5 is an enlarged fragmentary sectional view of the right end portion of the torsion drive assembly shown in FIG. 2.

The present invention provides a novel torsion drive assembly for use in transmitting torque from a drive element to a driven element. Although the torsion drive assembly of the present invention is usable in various types of power transmitting mechanisms, it is particularly adapted for use in vehicles, especially for transmitting the torque between a drive or output element of a differential and a front wheel of a motor vehicle, and is herein shown, for the purposes of illustration, as being embodied in a front wheel drive automobile 10.

Referring to FIG. 1 of the drawings, a schematic view of a front wheel drive automobile 10 is there shown. The automobile 10 includes a conventional engine and power transmission means 11 and a conventional or suitable front drive differential 12 operatively connected therewith. The differential 12 is drivingly connected with each of the front wheels 14 of the automobile 10 by a torsion drive assembly 15. Since both the left and right torsion drive assemblies 15 for the left and right front wheels 14, respectively, are of an identical construction, only the right torsion drive assembly 15 will be described in detail.

The torsion drive assembly 15 generally comprises an input member 20 which is adapted to be drivingly connected with a drive or output element 21 of the differential 12, an output member 25 which is adapted to be drivingly connected with the wheel 14 of the automobile 10 and a relatively elastic torque transmitting torsion element 28 having its opposite ends drivingly connected with the input member 20 and the output member 25. The torque transmitting torsion element normally transmits the torque from the input member 20 to the output member 25 and is twistable or torsionally movable about its longitudinal axis to absorb and cushion any impact or shock loads imparted to the drive assembly 15.

The torsion drive assembly 15 further comprises a second torque transmitting element 30. The element 30 is drivingly connected with the output member 25 at one end thereof. A coupling means, designated generally by reference numeral 32, is effective to drivingly couple the input member 20 and the torque transmitting element 30 together when the torque transmitting torsion element 28 is twisted a predetermined angular extent. When the input member 20 and element 30 are drivingly connected, torque is then transmitted through both elements 28 and 30 to the output member 25.

The input and output members 20, 25 are here shown as being in the form of sleeves provided with circumferentially spaced, axially extending external splines 35, 36 along their left and right end portions, respectively, as viewed in FIG. 2. The splines 35 are adapted to meshingly engage internal splines on the drive element 21 of the differential 12 to effect a driving connection therebetween. The external splines 36 on the output member 25 are adapted to meshingly engage internal splines on a hub portion of the wheel 14 to effect a driving connection therebetween. The input and output members 20, 25 are connected to the drive element 21 and the wheel 14, respectively, to prevent relative axial movement therebetween in any suitable or conventional manner.

The torque transmitting element 28 is here shown as being in the form of a solid cylindrical torsion shaft which extends through the input and output members 20, 25 and is concentric therewith. The input and output members 20 and 25 at their left and right ends, as viewed in FIG. 2, are respectively suitably fixed or rigidly connected to the opposite ends of the torsion shaft 28. Preferably, these members are press fitted on the element 28, as indicated at 20a, 25a.

The torsion shaft 28 normally transmits the torque imparted to the input member 20 by the drive element 21 to the output member 25 which in turn imparts the torque to the wheel 14 of the automobile 10. The torsion shaft 28 is twistable or torsionally movable about its longitudinal axis 40 in opposite directions to provide a cushion to reduce or absorb the impact and shock loads imparted to the drive assembly 15. This cushioning of the impact and shock loads eliminates or minimizes the metal to metal shock and backlash, which is both noisy and wears the gears of the differential 12 and the power transmission 11.

The impact loads imparted to the torsion drive assembly 15 are due primarily to torque reversals, such as when the power transmission of the automobile is shifted from forward to reverse, or vice versa. Impact loads due to torque reversals also occur under driving conditions, such as when the automobile is coasting down a hill wherein the wheels 14 tend to drive the engine or upon accelerating the engine wherein the transmission and engine take up the backlash of the system in which an impact noise is generated. The torsion shaft 28 has an elastic rate, i.e., the resistance to torsional movement about its longitudinal axis, such that it twists to cushion the impact loads or shock that takes place due to these torque reversals and thus, effectively dampens out the noise which would otherwise occur due to the metal to metal contact and backlash of the gears in the differential, etc. caused by these torque reversals.

To prevent the torsion shaft 28 from twisting beyond a predetermined angular extent, the torsion drive assembly 15 is provided with the torque transmitting member 30 and coupling means 32 which automatically drivingly connects the member 30 to the input member 20 to transmit the torque from the input member 20 to the output member 25 when the torsion shaft 28 has been torsionally moved about its longitudinal axis a predetermined angular extent. The torque transmitting element 30 is here shown as being in the form of a torsion sleeve or tube which surrounds the torsion shaft 28 and is concentric therewith. Preferably, the member 30 is relatively inelastic or rigid as compared to shaft 28. As shown in FIGS. 2 and 5, the output member 25 adjacent its left end portion is provided with external splines 45 which are press fitted between internal splines 46 at the right end of the torsion sleeve 30 to rigidly connect or fix the torsion sleeve 30 to the output member 25 for rotation with the latter.

The input member 20 is coupled or drivingly connected with the sleeve 30 by the coupling means 32 when the torsion shaft 28 has been torsionally moved a predetermined angular extent. The coupling means 32 comprises cooperable portions 50 and 51 on the input member 20 and the torsion sleeve 30 which are interdigitated with each other and which are adapted to engage each other to drivingly connect the input member and the torsion sleeve 30 together when the shaft 28 has been twisted in either direction about its longitudinal axis 40 to a predetermined angular extent. The cooperable portions 50 on the input member 20 comprise a plurality of circumferentially spaced, axially extending, external splines formed on the right end portion of the input member 20, as viewed in FIG. 2. The cooperable portions 51 on the torsion sleeve 30 comprise a plurality of integrally formed, circumferentially spaced, axially extending splines formed within the left end portion of the sleeve 30.

The splines 50 on the input member 20 are received between adjacent ones of the splines 51 on the torsion sleeve 30, and when the torsion shaft 28 is free of any torsionally imposed forces the splines 50 are disposed equi-distant between adjacent ones of the splines 51 on the torsion sleeve 30. As best shown in FIG. 3, the outer ends or surfaces 55 on the splines 50 are spaced radially inwardly from the bottom walls of the recesses between adjacent splines 51 on the torsion sleeve 30 and the innermost ends or surfaces 56 of the splines 51 are located radially outwardly from the bottom walls of the recesses between adjacent ones of the splines 50 on the input member 20. The internally splined left end of the sleeve 30, as viewed in FIG. 2, slidably receives the externally splined right end of the input member 20 so as to permit relative axial movement therebetween to accommodate for any shortening of the torsion shaft 28 during its twisting or torsional movements.

From the foregoing, it should be apparent that when impact or shock loads are imparted to the torsion drive assembly 15 the torsion shaft 28 will twist about its longitudinal axis 40 to cushion the impact or shock loads so as to eliminate or minimize any metal to metal shock or backlash in the gears and gear trains of the differential, etc., and thus, dampen out noise and increase the life of the gears. The extent of the twist or torsional movement permitted in either direction is limited by the angular distance between adjacent side faces of the splines 50 and 51. It should also be apparent that when the torsion shaft 28 has been twisted in either direction the predetermined angular extent, the splines 50 on the input member 20 and the splines 51 in the torsion sleeve 30 engage one another along their adjacent side faces to drivingly connect the input member 20 and torsion sleeve 30 together and cause the driving torque to be transmitted between the input and output members 20 and 25 through the torsion sleeve 30. It should be noted that the construction described above enables the torsion shaft 28 to twist or "wind-up" in either direction through a relatively large angular extent, preferably approximately 17½°, prior to the torque being transmitted through the relatively inelastic or rigid torsion sleeve 30.

To maintain the free or left end of the outer torsion sleeve 30, and viewed in FIG. 2, in concentric spaced relation to the torsion shaft 28 and the input member 20 such that no contact occurs between the outer and inner ends 55 and 56 of the splines 50 and 51, respectively, a support means 70 is interposed between the torsion shaft 28 and the sleeve 30 adjacent its free end. The support means 70 is here shown as being an annular elastic ring-shaped member, preferably a rubber grommet 71, whose inner periphery is press fitted onto the torsion shaft 28 and whose outer periphery is press fitted within the torsion sleeve 30. The employment of a rubber grommet 71 at this location between the torsion shaft 28 and the torsion sleeve 30 provides a number of advantages. The rubber grommet 71 functions as a dampener and aids in dampening the noise due to the impact or shock loads imparted to the drive assembly as well as serving to maintain the sleeve 30 concentric with respect to the longitudinal axis 40 of the torsion shaft 28 to maintain a radial space therebetween and thus prevent rattling and fretting wear between the splines 50 and 51 on the input member 20 and the torsion sleeve 30. The rubber grommet 71 also aids in preventing bending of the shaft 28 and provides a lubricant seal.

It should be noted that the assembly 15 is reversible in that member 25 could constitute the input member connected to element 21 and member 20 could constitute the output member. It should also be understood that the torsion sleeve 30 and the output member 25 could be formed of one integral member, if desired, and/or that the coupling means 32 could be formed by providing the input member 25 and the torsion sleeve 30 with axially extending circumferentially spaced portions or fingers which are interdigitated with one another and which would cooperably engage one another in the same manner that the splines 50 and 51 cooperably engage one another.

It should also be noted that the novel torsion drive or axle assembly 15 of the present invention provides a constant spring or elastic rate independent of temperature variations because the torque is transmitted through members or elements which are unaffected or substantially unaffected by variations in temperature.

From the foregoing, it can be seen that a novel torsion drive assembly for transmitting the torque between a drive element and a driven element has been provided. It can also be seen that a novel torsion drive assembly having an elastic torque transmitting element for normally transmitting the torque between an input and an output member and which is effective to cushion or absorb the impact loads imposed on the assembly and a novel coupling and support arrangement for transmitting the torque through a relatively non-elastic torque transmitting element upon the elastic torque transmitting element having been twisted a predetermined angular extent has been provided. Additionally it can be seen that the novel torsion drive assembly which includes a novel dampening and support means which aids in dampening the noise by preventing rattling or fretting wear between the elastic and inelastic torque transmitting elements and which also provides a seal therebetween has been provided.

While the preferred embodiment of the present invention has been described in considerable detail, it will be apparent that the invention is not limited to the construction shown and that it is my intention to cover hereby all adaptations, modifications and changes therein which come within the scope of the appended claims.

Having described our invention, we claim:

1. A torsion drive assembly for use in transmitting the torque from a drive element to a driven element comprising an input member to be drivingly connected to the drive element, an output member to be drivingly connected to the driven element, a torsion shaft having one end fixed to said input member for rotation therewith and the other end fixed to said output member to rotate the latter, a torsion sleeve concentric with said torsion shaft and having one end fixed to said input member, said torsion shaft having a resistance to torsional movement which is less than the resistance to torsional movement of said sleeve, said torsion sleeve at its end remote from said one end and said output member having circumferentially spaced portions thereon which are interdigitated with and circumferentially spaced from each other a predetermined angular extent when the torsion shaft is free of any torsionally imposed forces, said portions on said sleeve comprising splines extending inwardly radially from a base portion of said sleeve and said portions on said output member comprising splines extending radially into the space between said splines on said sleeve, and a support and torsion dampener means in the form of a resilient grommet press fitted on said torsion shaft and in said torsion sleeve and located adjacent said cooperable portions for concentrically supporting said sleeve with respect to said output member to prevent rattling engagement therebetween and to provide for maintenance of a radial spaced relationship between the outer tips of said splines on said output member and the base portion of said sleeve, said support means having surfaces providing a seal to prevent the flow of lubricant axially through said torsion sleeve.

2. A torsion drive assembly as defined in claim 1 wherein said splines on said output member are spaced approximately equi-distant from adjacent splines on said sleeve when said shaft is free of any torsionally imposed forces.

3. A torsion drive assembly, as defined in claim 2, wherein said torsion drive assembly is an axle assembly for transmitting the torque from a front differential to a front wheel of a front wheel drive vehicle.

References Cited

UNITED STATES PATENTS

| 2,394,405 | 2/1946 | Schjolin. | |
| 2,703,847 | 3/1955 | Kalikow | 64—1 X |
| 2,889,695 | 6/1959 | Moeller | 64—1 |
| 3,141,313 | 7/1964 | Brickett et al. | 64—27 |
| 3,321,988 | 5/1967 | Peras | 64—27 |

FOREIGN PATENTS 674,293  6/1952  Great Britain.

HALL C. COE, Primary Examiner.